United States Patent
Park et al.

(10) Patent No.: US 9,061,339 B2
(45) Date of Patent: Jun. 23, 2015

(54) METHOD FOR MANUFACTURING A SHEET MOLDED TO FORM A MULTI-DIMENSIONAL CURVED SURFACE

(75) Inventors: Kwan-Chun Park, Gyeonggi-do (KR); Byeong-Kwon Kim, Busan-Si (KR)

(73) Assignees: STEEL LIFE CO., LTD., Gwangmyeong-Si, Gyeonggi-Do (KR); STEEL FLOWER CO., LTD., Busan (KR)

( * ) Notice: Subject to any disclaimer, the term of this patent is extended or adjusted under 35 U.S.C. 154(b) by 287 days.

(21) Appl. No.: 13/703,035

(22) PCT Filed: Jun. 10, 2011

(86) PCT No.: PCT/KR2011/004286
§ 371 (c)(1),
(2), (4) Date: Dec. 10, 2012

(87) PCT Pub. No.: WO2011/155798
PCT Pub. Date: Dec. 15, 2011

(65) Prior Publication Data
US 2013/0086966 A1    Apr. 11, 2013

(30) Foreign Application Priority Data
Jun. 11, 2010    (KR) ........................ 10-2010-0055593

(51) Int. Cl.
*B21D 35/00*    (2006.01)
*B21D 22/02*    (2006.01)
(Continued)

(52) U.S. Cl.
CPC .............. *B21D 35/002* (2013.01); *B21D 22/02* (2013.01); *B21D 25/02* (2013.01); *B23K 26/38* (2013.01)

(58) Field of Classification Search
CPC ........ B21D 25/00; B21D 25/02; B21D 25/04; B21D 22/02; B21D 35/002; B23K 26/38
USPC .......... 72/6.1, 17.2, 0.1, 21.1–21.6, 293–297, 72/301–305, 311, 362, 372, 379.2, 379.6, 72/380, 385, 394, 395–397, 403, 462, 463, 72/466, 466.2, 466.7, 384, 413, 465.1, 72/446, 473, 478; 219/121.79
See application file for complete search history.

(56) References Cited

U.S. PATENT DOCUMENTS 6,089,061 A * 7/2000 Haas et al. ...................... 72/14.8
6,272,897 B1    8/2001 Ciranna
(Continued)

FOREIGN PATENT DOCUMENTS

JP        06-227583       4/1996
JP        08-090077 A    4/1996
(Continued)

OTHER PUBLICATIONS

Cai, Zhong-Yi et al., Numerical simulation for the multi-point stretch forming process of sheet metal, journal of materials processing technology 209 (2009) pp. 396-407.

*Primary Examiner* — David B Jones
(74) *Attorney, Agent, or Firm* — Novick, Kim & Lee, PLLC; Jae Youn Kim

(57) ABSTRACT

A method for manufacturing molded plates with multi-composite curved surface is provided to manufacture a forming plate having various cubic multi-composite curved surfaces. The operation program of an upper mold, a lower mold, a stretching forming unit, a marking robot, and a cutting robot is inputted (S1). The upper surface of the lower mold and the lower surface of the upper mold are formed into the shape of multi-composite curved surface (S2). After a metal plate is positioned on the upper surface of the lower mold, both ends thereof are clamped by multiple stretching forming units (S3). The metal plate is molded into the shape of the multi-composite curved surface (S4). The metal plate is marked by the marking robot (S5).

1 Claim, 2 Drawing Sheets

(51) Int. Cl.
 *B21D 25/02* (2006.01)
 *B23K 26/38* (2014.01)

(56) References Cited

U.S. PATENT DOCUMENTS 6,601,426 B2 * 8/2003 Wegener .......................... 72/294
7,568,371 B2 8/2009 Polen et al.
2008/0025014 A1 * 1/2008 Chen .............................. 362/89

FOREIGN PATENT DOCUMENTS

| KR | 10-2008-0000880 | | 1/2008 |
| KR | 10-2008-0000880 | A | 1/2008 |
| KR | 10-2008-0085917 | A | 9/2008 |
| KR | 10-2009-0055348 | A | 6/2009 |

* cited by examiner

METHOD FOR MANUFACTURING A SHEET MOLDED TO FORM A MULTI-DIMENSIONAL CURVED SURFACE

TECHNICAL FIELD

The present invention relates to a method for manufacturing a sheet molded to form a multi-dimensional curved surface, and more particularly, to a method for manufacturing a sheet molded to form a multi-dimensional curved surface, wherein symmetrical specific shapes of a multi-dimensional curved surface are set in upper and lower molds to be formed in variable shapes, using a number of multipoint molding pins; a metal sheet to be molded to form a specific multi-dimensional curved surface is secured to a top surface of the lower mold forming the specific shape of the multi-dimensional curved surface; both ends of the metal sheet are pulled by a force exceeding a plastic point and a yield point of the metal sheet by using a plurality of stretching forming machines, to primarily form the multi-dimensional curved surface in the same shape molded on the top surface of the lower mold; the upper mold, which has a bottom surface forming a symmetrical shape of the multi-dimensional curved surface to the shape formed on the top surface of the lower mold, moves down to press the metal sheet stretched in the shape formed on the lower mold as the shape is; and when the multi-dimensional curved surface is perfectly formed so as not to have a spring back phenomenon in the formed metal sheet, a marking robot marks certain programmed dimensions and shape on the metal sheet and then a cutting robot laser-cuts the metal sheet, along the marking line, thereby finally obtaining a sheet molded to form the multi-dimensional curved surface in the certain desired dimensions and shape. This high quality sheet molded to form the multi-dimensional curved surface according to this invention does not have the spring back phenomenon present in the prior art. Further, it is possible to manufacture building structures in more various shapes by using these sheets.

BACKGROUND ART

In general, when metal sheets are used as the exterior walls of diverse buildings, the metal sheets molded to form variously curved surfaces have been used for finishing materials of the building exterior walls in order to improve the sense of beauty of the whole city in line with unique designs of the buildings. Most conventional metal sheets with curved surfaces have been molded by a 'method for molding a curved surface on a metal sheet' disclosed in Korean Laid-open Patent No. 10-2009-0055348.

However, according to the method for molding a curved surface which is disclosed in Korean Laid-open Patent No. 10-2009-0055348, a metal sheet with a desired curved surface in a specific shape is obtained simply by pressing a metal sheet positioned between upper and lower molds having a number of form punches which are hydraulically operated. Therefore, it is impossible to produce a sheet molded to form a more precise and gorgeous multi-dimensional curved surface. Moreover, it is impossible to absolutely eliminate the spring back phenomenon of the molded metal sheet.

DISCLOSURE

Technical Problem

Therefore, the present invention solves the above problems of the conventional method for molding a curved surface on a metal sheet, wherein a metal sheet is molded to form a complicated curved surface in a specific shape simply by the pressing of the upper and lower molds using a number of form punches, and it is an aspect of the present invention to provide a method for molding a sheet molded to form a multi-dimensional curved surface, wherein, when upper and lower molds are constituted in variable shapes using a number of multipoint molding pins to be set in consideration of the material properties and strain deformation of a metal sheet to be molded to form a multi-dimensional curved surface, and when the metal sheet is positioned on a multi-dimensional curved surface of the lower mold, both ends of the metal sheet are pulled by a force exceeding a yield point of the metal sheet by a plurality of stretching forming machines, so that the metal sheet is stretched in the shape of the multi-dimensional curved surface formed on the lower mold; the upper mold, which has a bottom surface forming a symmetrical shape of the multi-dimensional curved surface to the shape of the multi-dimensional curved surface formed on a top surface of the lower mold by the multipoint molding pins, moves down to press a top surface of the metal sheet stretched in the shape of the multi-dimensional curved surface formed on the top surface of the lower mold; and when the multi-dimensional curved surface in the specific shape is formed to absolutely eliminate a spring back phenomenon of the metal sheet, the metal sheet to form the multi-dimensional curved surface is marked and cut in certain programmed dimensions and shape by a marking robot and a cutting robot, to obtain a sheet molded to form the desired multi-dimensional curved surface. Therefore, the method according to the present invention enables the precise manufacturing of a sheet molded to form the multi-dimensional curved surface, based on advanced technology. It also enables to differently design the shapes of the exterior walls of diverse buildings and improves the sense of beauty of the city.

Technical Solution

In accordance with an embodiment of the present invention, there is provided a method for manufacturing a sheet molded to form a multi-dimensional curved surface, comprising: an operating environment program inputting step S1, to input all sorts of operating environment programs for upper and lower molds 1 and 2, stretching forming machines 3, a marking robot 4 and a cutting robot 5 to obtain a curved surface in a desired shape, based on data of strain deformation according to material properties of a metal sheet to be molded; a upper and lower mold processing standby step S2, to form a top surface of the lower mold 2 and a bottom surface of the upper mold 1 in a specific shape of the multi-dimensional curved surface by driving each of a number of multi-point molding pins 21 and 11, based on programmed values; a metal sheet clamping step S3, to respectively clamp both ends of the metal sheet by using a plurality of stretching forming machines 3 after positioning the metal sheet on the top surface of the lower mold 2 in the specific shape of the multi-dimensional curved surface; a metal sheet stretching and pressing step S4, to pull the clamped metal sheet to be secured to the top surface of the lower mold 2 by the stretching forming machines 3 and to press a top surface of the metal sheet by the bottom surface of the upper mold 1 moving down onto the top surface of the metal sheet, so that the metal sheet is formed in the shape of the multi-dimensional curved surface; a metal sheet marking step S5, to mark certain dimensions and shape on the metal sheet molded to form the shape of the multi-dimensional curved surface by the marking robot 4 after the upper mold 1 moves up; and a metal sheet cutting step S6, to laser-cut the marked metal sheet by the cutting robot 5, along the marking lined shape, to finally complete the processing of a sheet 6 molded to form the multi-dimensional curved surface.

Advantageous Effects

As described above, in the method for manufacturing a sheet molded to form a multi-dimensional curved surface according to the present invention, a metal sheet used as a finishing material of the exterior wall of a building is pulled by the force exceeding the yield point and plastic point of the metal sheet by a plurality of the stretching forming machines, each capable of pivoting, in addition to the upper and lower molds having a number of the multipoint molding pins, thereby precisely manufacturing a sheet molded to form a multi-dimensional curved surface in more various and stereoscopic 3D shapes. Since it is possible to obtain a sheet molded to form a multi-dimensional curved surface which is precisely manufactured in a specific shape and in which the spring back phenomenon of the metal sheet is eliminated, it is possible to build buildings with more different and beautiful appearances by using those sheets molded to form multi-dimensional curved surfaces and thus the sense of beauty of the city is improved.

DESCRIPTION OF DRAWINGS

These and other aspects and advantages of the present invention will become apparent and more readily appreciated from the following description of the embodiment, taken in conjunction with the accompanying drawings, in which.

BEST MODE

Figure 1:
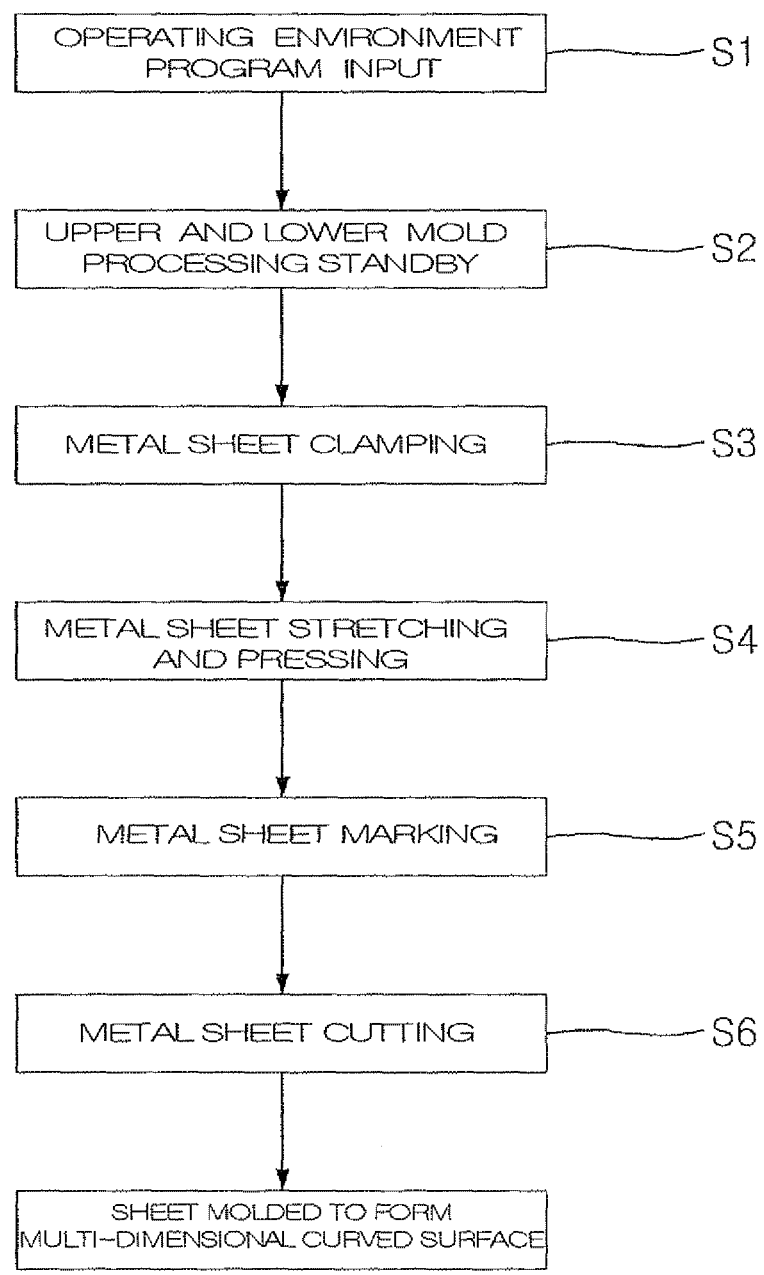
FIG. 1 is a flow chart of a method for manufacturing a sheet molded to form a multi-dimensional curved surface according to the present invention.
Figure 2:
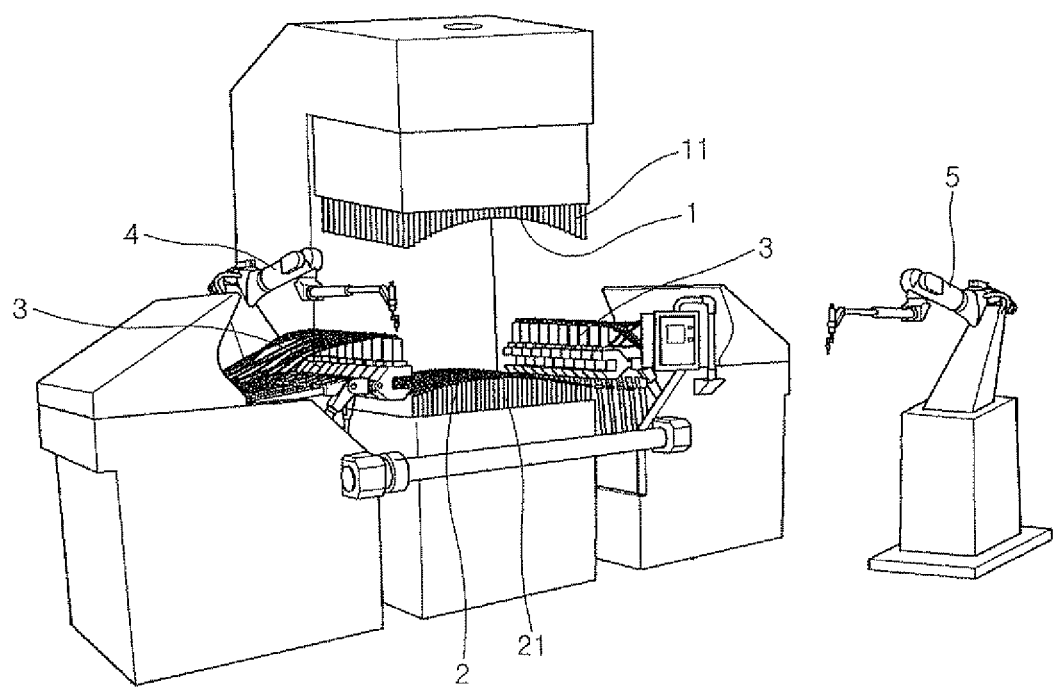
FIG. 2 is a schematic view of an apparatus applied to the flow chart of the method according to the present invention.
Figure 3:
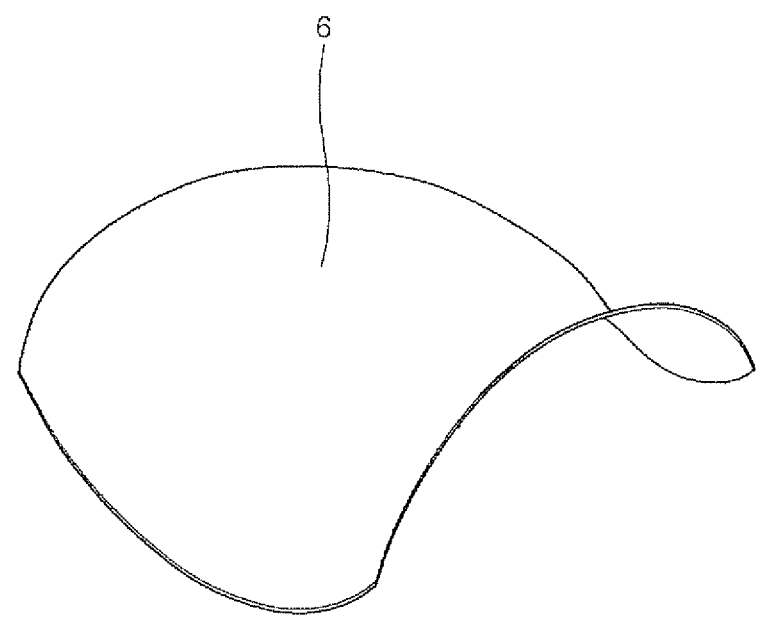
FIG. 3 is an example of a sheet manufactured by the flow chart of the method according to the present invention.

A method for manufacturing a sheet molded to form a multi-dimensional curved surface according to the present invention comprises:

an operating environment program inputting step S1, to input all sorts of operating environment programs for upper and lower molds 1 and 2, stretching forming machines 3, a marking robot 4 and a cutting robot 5 to obtain a curved surface in a desired shape, based on data of strain deformation according to material properties of a metal sheet to be molded;

a upper and lower mold processing standby step S2, to form a top surface of the lower mold 2 and a bottom surface of the upper mold 1 in a specific shape of the multi-dimensional curved surface by driving each of a number of multipoint molding pins 21 and 11, based on programmed values;

a metal sheet clamping step S3, to respectively clamp both ends of the metal sheet by using a plurality of the stretching forming machines 3 after positioning the metal sheet on the top surface of the lower mold 2 in the specific shape of the multi-dimensional curved surface;

a metal sheet stretching and pressing step S4, to pull the clamped metal sheet to be secured to the top surface of the lower mold 2 by the stretching forming machines 3 and to press a top surface of the metal sheet by the bottom surface of the upper mold 1 moving down onto the top surface of the metal sheet, so that the metal sheet is formed in the shape of the multi-dimensional curved surface;

a metal sheet marking step S5, to mark certain dimensions and shape on the metal sheet molded to form the shape of the multi-dimensional curved surface by the marking robot 4 after the upper mold 1 moves up; and a metal sheet cutting step S6, to laser-cut the marked metal sheet by the cutting robot 5, along the marking lined shape, to finally complete the processing of a sheet 6 molded to form the multi-dimensional curved surface, wherein, at the metal sheet stretching and pressing step S4, a soft sheet is used between the lower mold 2 and the metal sheet, and when the metal sheet is pulled by the stretching forming machines 3, the metal sheet is pulled by force exceeding a yield point and a plastic point of the metal sheet, so that a spring back phenomenon of the metal sheet does not occur.

MODE FOR INVENTION

The present invention will now be described more fully hereinafter with reference to the accompanying drawings, in which a preferred embodiment of the invention is shown so that those of ordinary skill in the art can easily carry out the present invention.

A method for manufacturing a sheet molded to form a multi-dimensional curved surface according to the present invention makes it possible to more easily and precisely manufacture a sheet molded to form a multi-dimensional curved surface in a 3D shape, using a flat metal sheet. The operating environment program inputting step S1 is to input, in a main computer, the operating environments, such as the relevant data according to the dimensions of a material, i.e., a metal sheet to be molded to form a multi-dimensional curved surface, the properties of the material, the strain deformation of the material, etc. This is to set and control the location of a number of the multipoint molding pins 11, 12 constituting the upper and lower molds 1, 2, the stretching directions of the stretching forming machines 3 and the operating environments of the marking robot 4 and the cutting robot 5, based on the input data values.

At the upper and lower mold processing standby step S2, a number of the multipoint molding pins 21 are activated according to the input operating environments for the metal sheet to process the multi-dimensional curved surface, so that tops of the multipoint molding pins 21 form the multi-dimensional curved surface in a specific shape. Then, the metal sheet to be molded is positioned on the top surface of the lower mold 2 forming the multi-dimensional curved surface in the specific shape. This is now ready to clamp the metal sheet by using the stretching forming machines.

At the metal sheet clamping step S3, a number of clamps of the stretching forming machines 3 grab and strongly pull both ends of the metal sheet positioned on the top surface of the lower mold 2 forming the multi-dimensional curved surface in the specific shape by a number of the multipoint molding pins 21. Each of the clamps constituting the stretching forming machines 3 is structured to be pivotable in any direction.

At the metal sheet stretching and pressing step S4, the stretching forming machines 3 each clamping both ends of the metal sheet positioned on the top surface of the lower mold 2 by a number of the clamps are activated to stretch the metal sheet. The force to pull to stretch the metal sheet exceeds the yield point and the plastic point of the metal sheet.

Since the force pulls the metal sheet, a spring back phenomenon of the metal sheet is basically eliminated from occurring.

When the metal sheet is a steel sheet for a general board, a permanent deformation of a product occurs at more than 180~240 kg·f. In an aluminum sheet, a yield point where a permanent deformation occurs exists at about 160~190 kg·f.

In the process of stretching the metal sheet, if needed, a soft sheet (pad), such as a urethane sheet, etc., may be selectively used on the contact side between the metal sheet and the lower mold 2, to protect the surface of the metal sheet. Further, as each of the stretching clamps of the stretching forming machines is installed to be pivotable, each stretching clamp is capable of pulling the clamped metal sheet in each different direction, thereby enabling to mold a multi-dimensional curved surface in more diverse shapes.

Since the stretching forming machines evenly distribute the force over the whole metal sheet, the spring back phenomenon is eliminated.

At the metal sheet pressing step, when the metal sheet secured on the top surface of the lower mold 2 is stretched by the stretching forming machines 3 and it is primarily molded to form the multi-dimensional curved surface in the shape formed on the top surface of the lower mold 2, the upper mold 1 moves down on the top surface of the metal sheet, so that the multi-dimensional curved surface is secondarily formed on the metal sheet. Then, a number of the multipoint molding pins 11 constituting the upper mold 1 are set in a symmetrical shape to the shape of the multi-dimensional curved surface formed by the multipoint molding pins 21 of the lower mold 2. Therefore, the metal sheet which is pulled by the force exceeding the yield point by the stretching forming machines 3 and molded in the specific shape is again pressed on the lower mold 2 by the upper mold 1, thereby molding the perfect multi-dimensional curved surface.

A number of the multipoint molding pins 11, 21 constituting the upper and lower molds 1, 2 totals about 2,400 including 1200 for the upper mold 1 and 1200 for the lower mold 2. The multipoint molding pins 11, 21 include driving drivers to be controlled by a computer. Each multipoint molding pin includes a DC core, an encoder and a reducer for more precise operating control.

At the metal sheet marking step S5, when the metal sheet is molded to form the multi-dimensional curved surface in the specific shape by completing the stretching using the stretching forming machines 3 and the pressing using the upper mold 1 and the upper mold 1 moves up, the marking robot 4 is activated to mark pre-programmed certain shape and dimensions on the metal sheet, as a step before cutting the metal sheet in the certain dimensions and shape as the finishing material for an exterior wall.

At the metal sheet cutting step S6, the cutting robot 5 performs a process of laser-cutting the marking line of the metal sheet as marked, thereby finally completing the manufacturing of a sheet 6 molded to form the multi-dimensional curved surface.

To manufacture the sheet molded to form the multi-dimensional curved surface according to the above described process/method, a worker operates a operating environment programmed control panel which is installed at one side of a molding apparatus, to operate each machine at each step.

The sheet(s) molded to form the multi-dimensional curved surface according to the present invention is described as being mostly used for the finishing material of the exterior wall of a building. However, the sheet(s) may be used as the finishing materials where a streamline shape is required, such as a curved surface for shipbuilding, an aircraft body or an exterior of a high-speed train.

The invention has been described using a preferred exemplary embodiment(s). However, it is to be understood that the scope of the invention is not limited to the disclosed embodiment(s). On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

[Industrial Applicability]

The method for manufacturing a sheet molded to form a multi-dimensional curved surface according to the present invention precisely molds metal sheets which are used as finishing materials for the exteriors of various buildings in the sheets molded to form a multi-dimensional curved surface in diverse and stereoscopic 3D shapes, making it possible to manufacture buildings having more unique and beautiful appearances.

The invention claimed is:

1. A method for manufacturing a sheet molded to form a multi-dimensional curved surface, comprising:
    an operating environment program inputting step, to input all sorts of operating environment programs for upper and lower molds, a first and a second stretching forming machines, a marking robot and a cutting robot to obtain a curved surface in a desired shape, based on data of strain deformation according to material properties of a metal sheet to be molded, wherein the first stretching forming machine comprises a first plurality of clamps and is disposed on one side of the lower mold, and the second starching forming machine comprises a second plurality of clamps and is disposed on another side of the lower mold;
    an upper and lower mold processing standby step, to form a top surface of the lower mold and a bottom surface of the upper mold in a specific shape of the multi-dimensional curved surface by driving each of a number of multipoint molding pins and, based on programmed values;
    a metal sheet clamping step, to respectively clamp a plurality of ends of the metal sheet by using the first and second stretching forming machines after positioning the metal sheet on the top surface of the lower mold in the specific shape of the multi-dimensional curved surface, wherein each of the first and second plurality of clamps is configured to clamp each of the plurality of ends of the metal sheet respectively;
    a metal sheet stretching and pressing step, to pull the clamped metal sheet to be secured to the top surface of the lower mold by the first and second stretching forming machines and to press a top surface of the metal sheet by the bottom surface of the upper mold moving down onto the top surface of the metal sheet, so that the metal sheet is formed in the shape of the multi-dimensional curved surface, wherein each of the first and second plurality of clamps is configured to pull each of the plurality of ends of the metal sheet in a different direction from one another;
    a metal sheet marking step, to mark certain dimensions and shape on the metal sheet molded to form the shape of the multi-dimensional curved surface by the marking robot after the upper mold moves up; and a metal sheet cutting step, to laser-cut the marked metal sheet by the cutting robot, along the marking lined shape, to finally complete the processing of the sheet molded to form the multi-dimensional curved surface, wherein, at the metal sheet stretching and pressing step, a soft sheet is used between the lower mold and the metal sheet, and when the metal sheet is pulled by the stretching forming machines, the metal sheet is pulled by force exceeding a yield point and a plastic point of the metal sheet, so that a spring back phenomenon of the metal sheet is eliminated.

* * * * *

UNITED STATES PATENT AND TRADEMARK OFFICE
CERTIFICATE OF CORRECTION

PATENT NO. : 9,061,339 B2  
APPLICATION NO. : 13/703035  
DATED : June 23, 2015  
INVENTOR(S) : Kwang-Chun Park et al.

Page 1 of 1

It is certified that error appears in the above-identified patent and that said Letters Patent is hereby corrected as shown below:

On the title page Item (75) Inventors:  
        Change "Kwan-Chun Park, Gyeonggi-do (KR); Byeong-Kwon Kim, Busan-Si (KR)" to  
        --Kwang-Chun Park, Gyeonggi-do (KR); Byeong-Kwon Kim, Busan-Si (KR)--

Signed and Sealed this  
Twenty-sixth Day of April, 2016

Michelle K. Lee  
*Director of the United States Patent and Trademark Office*